(12) United States Patent
Chen

(10) Patent No.: US 7,529,413 B2
(45) Date of Patent: May 5, 2009

(54) METHOD FOR REDUCING DATA AMOUNT IN AN IMAGE MEMORY SYSTEM

(75) Inventor: Wen-Kuan Chen, ChuTun Cheng (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 694 days.

(21) Appl. No.: 10/909,348

(22) Filed: Aug. 3, 2004

(65) Prior Publication Data

US 2005/0100227 A1     May 12, 2005

(30) Foreign Application Priority Data

Nov. 10, 2003     (TW) .............................. 92131406 A

(51) Int. Cl.
    *G06K 9/36*      (2006.01)
(52) U.S. Cl. ................. 382/232; 382/233; 375/E7.095; 375/E7.252
(58) Field of Classification Search ................. 382/233, 382/236, 232; 375/E7.095, E7.252
See application file for complete search history.

(56) References Cited

U.S. PATENT DOCUMENTS

| | | | | |
|---|---|---|---|---|
| 5,949,919 A | * | 9/1999 | Chen | 382/276 |
| 6,037,988 A | * | 3/2000 | Gu et al. | 375/240.16 |
| 6,049,567 A | * | 4/2000 | Han | 375/240.16 |
| 6,181,825 B1 | * | 1/2001 | Ragland et al. | 382/239 |
| 6,259,810 B1 | * | 7/2001 | Gill et al. | 382/166 |
| 7,339,627 B2 | * | 3/2008 | Schoner et al. | 348/558 |
| 2004/0212731 A1 | * | 10/2004 | Sie et al. | 348/445 |
| 2005/0094033 A1 | * | 5/2005 | Schoner et al. | 348/558 |

* cited by examiner

*Primary Examiner*—Samir A. Ahmed
*Assistant Examiner*—Stephen R. Koziol
(74) *Attorney, Agent, or Firm*—Bacon & Thomas, PLLC

(57) ABSTRACT

A method for reducing data amount in an image memory system is disclosed. First, it omits one image column from every N image column in left and right portions of the input image, respectively, based on a predetermined percentage, thereby obtaining an image having a reduced data amount. Next, the image having the reduced data amount is sent to an image encoder to encode and accordingly store an encoded image. Then, the encoded image is transmitted to an image decoder through a transmission channel. Then, the encoded image is decoded by the image decoder as received, thereby obtaining a decoding image. Finally, a pixel insertion is performed on reduced image columns of the decoded image.

24 Claims, 7 Drawing Sheets

METHOD FOR REDUCING DATA AMOUNT IN AN IMAGE MEMORY SYSTEM

BACKGROUND OF THE INVENTION

1. Field of the Invention

The present invention relates to the technical field of image data processing and, more particularly, to a method for reducing the data amount in an image memory system.

2. Description of Related Art

Image compression and decompression are widely used in video and multimedia applications. In accordance with certain similarities between two adjacent frames of consecutive pictures, image compression can highly increase the efficiency of data compression. This is achieved by using motion estimation to omit data where a current frame is similar to the nearest preceding frame, and only recording the different ones. Such a compression method is also referred to as a frame-related compression. Image compression is performed in a unit of GOP (group of picture) consisting of three types, i.e. I, B and P frames. In general, a GOP has 15 frames: an I-frame at the first position, a P-frame at the second position, two B-frames at the next two positions, and so on. As such, the GOP is composed of a sequence of IPBB PBB PBB. I frame referred to as a full frame is an intra-coded picture which is coded independently without reference to other pictures and provides an access point to the coded sequence where decoding can begin, but is coded with only moderate compression; P frame is a predictive-coded picture which is obtained by omitting data of a current frame similar to the nearest preceding frame; and B frame is a bidirectionally predictive-coded picture which is obtained by omitting data of a current frame similar to that of the nearest preceding and upcoming pictures. The P and B frames are not complete frames that require reference to the I frame.

However, with current DRAM standards, DRAMs as image buffers can only have some specified capacities. When regarding cost, the data amount of each compressed frame (plus other required information) is still greater than the capacity of a typical DRAM. To reduce the data amount for meeting current DRAM standards, the compressed frames or pictures are further compressed. However, a conventional approach for further compression only processes a half frame of a motion picture at a time, thereby adding processing time and reducing the entire system efficiency. Therefore, it is desirable to provide an improved method to mitigate and/or obviate the aforementioned problems.

SUMMARY OF THE INVENTION

The object of the present invention is to provide a method for reducing data amount in an image memory system, which can reduce image data to be transmitted/stored, and meet current DRAM standards.

In accordance with one aspect of the present invention, there is provided a method for reducing data amount in an image memory system. The image memory system includes an image encoder and an image decoder. The image encoder codes an input image and sends the coded image through a transmission channel to the image decoder to decode and output. The input image includes a plurality of image lines, each having a plurality of pixels. An image column is defined by pixels located at same positions on the image lines. The method includes the steps: (A) based on a pre-determined percentage, omitting one image line from every N image line in the upper and lower portions of the input image 40, respectively, thereby obtaining an image having a reduced data amount (N is a positive integer greater than 1); (B) sending the image having the reduced data amount to the image encoder to code and accordingly store an encoded image; (C) transmitting the encoded image to the image decoder through the transmission channel; (D) decoding the encoded image by the image decoder as received, thereby obtaining a decoded image; and (E) performing pixel insertion on reduced image columns of the decoded image.

In accordance with another aspect of the present invention, there is provided a method for reducing data amount in an image memory system. The image memory system includes an image encoder and an image decoder. The image encoder codes an input image and sends a coded image through a transmission channel to the image decoder to decode and output. The input image includes a plurality of image lines, each having a plurality of pixels. The method includes the steps: (A) based on a pre-determined percentage, omitting one image line from every N image line in the upper and lower portions of the input image 40, respectively, thereby obtaining an image having a reduced data amount (N is a positive integer greater than 1); (B) sending the image having the reduced data amount to the image encoder to encode and accordingly store an encoded image; (C) transmitting the encoded image to the image decoder through the transmission channel; (D) decoding the encoded image by the image decoder as received, thereby obtaining a decoding image; and (E) performing a pixel insertion on reduced image lines of the decoded image.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
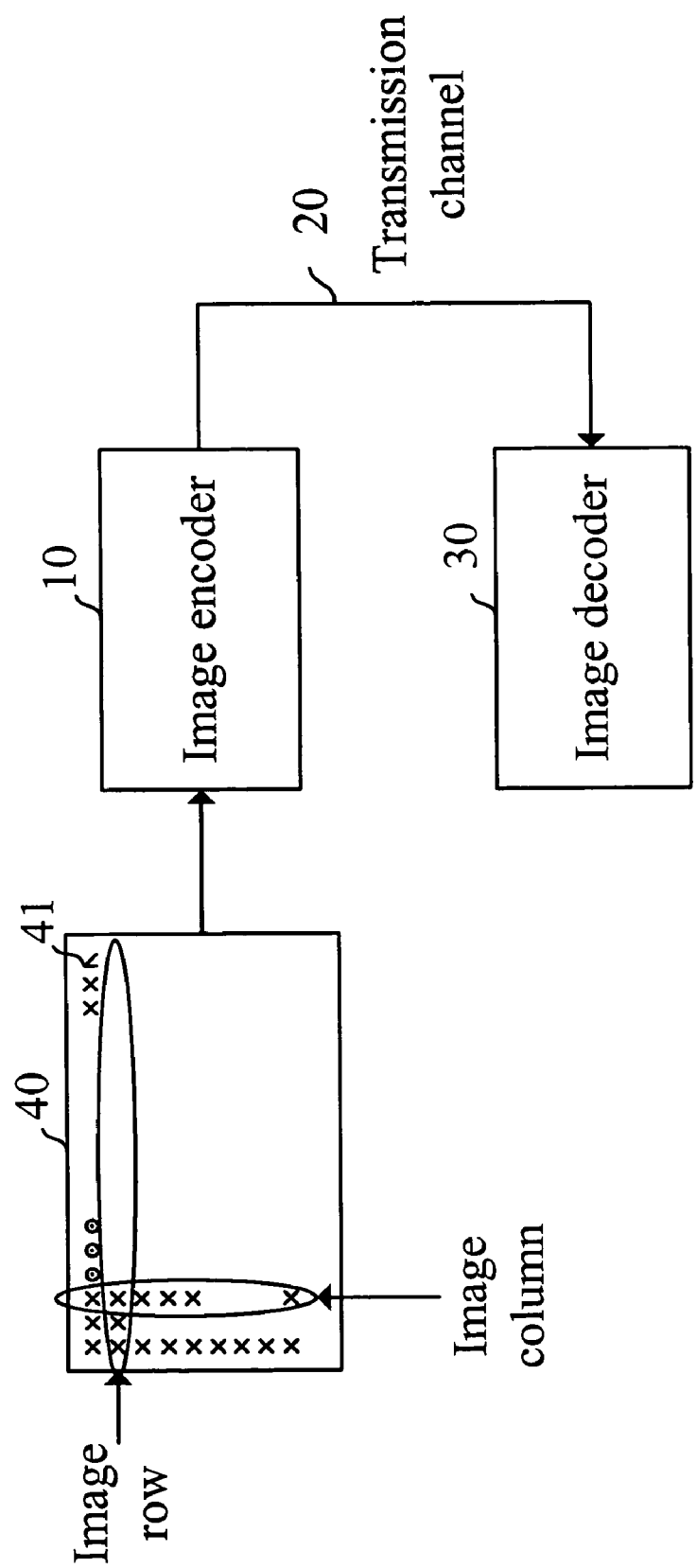
FIG. 1 is a schematic diagram of a system of reducing data in an image memory system in accordance with the invention.

FIG. 1 is a block diagram of a system for reducing data amount in an image memory system in accordance with the invention. As shown, the system includes an image encoder 10 and an image decoder 30. The image encoder 10 encodes an input image 40 and then sends it through a transmission channel 20 to the image decoder 30 to decode and output. The input image 40 includes a plurality of image lines, each having a plurality of pixels 41. An image column is defined by pixels located at same positions on the image lines.

Figure 2:
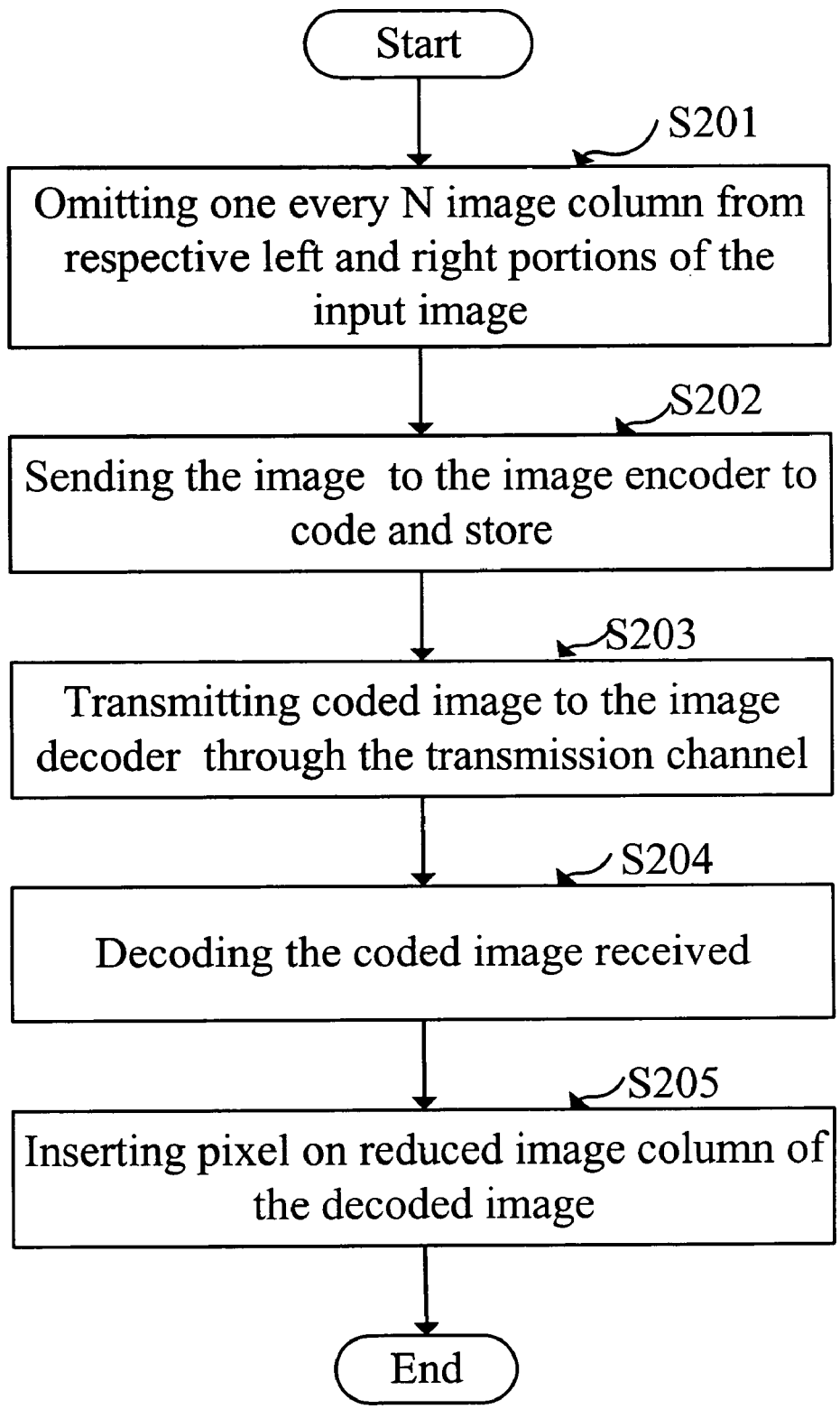
FIG. 2 is a flowchart of a method for reducing data amount in an image memory system in accordance with an embodiment of the invention.

FIG. 2 is a flowchart of a method for reducing data amount in an image memory system in accordance with an embodiment of the invention. As shown, in step S201, based on a predetermined percentage, one image column is omitted from every N image column in the left and right portions of the input image 40, respectively, thereby obtaining an image having a reduced data amount (N is a positive integer greater than 1). This is available because people normally focus or concentrate on the center of the image 40 and have poor sensibility of image definition at the edges. Accordingly, the data amount of the image can be reduced because it does not cause people unpleasantness in vision when reducing about 20% of total columns of the image 40.

Figure 3A:
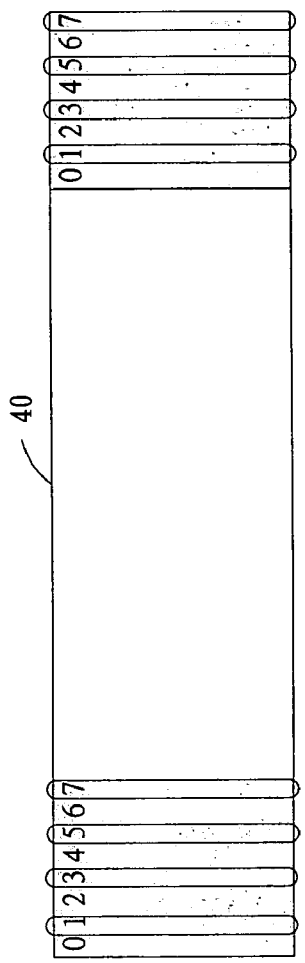
FIGS. 3A~C show an example of FIG. 2.
Figure 3B:
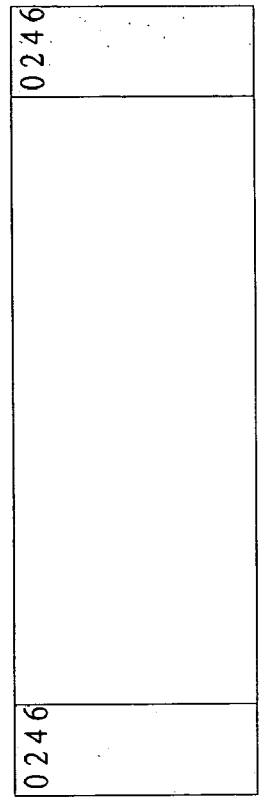

FIG. 3A shows an example of omitting one column from every 2 columns of respective left and right portions of the image 40. Thus, an image having a reduced data amount is obtained as shown in FIG. 3B.

In step S202, the image having reduced data amount is sent to the image encoder 10 to encode and store. The encoded image can be stored in a storage device such as non-volatile memory. The image encoder 10 can be an MPEG1, MPEG2 or H.263 image encoder.

In step S203, the encoded image is transmitted to the image decoder 30 through the transmission channel 20. The transmission channel 20 includes that the encoded image is accessed by the image decoder 30 through the storage device. In step S204, the image decoder 30 decodes the encoded image received.

In step S205, pixel insertion is performed on reduced image columns of the decoded image. The pixel insertion is achieved by, with respect to columns to be compensated, respectively copying corresponding pixel values of a preceding or upcoming column or an average of corresponding pixel values of preceding and upcoming columns. Alternatively, the pixel insertion can use an interpolation method or finite impulse response (FIR) filter to compute pixel values of the reduced image columns.

Figure 3C:
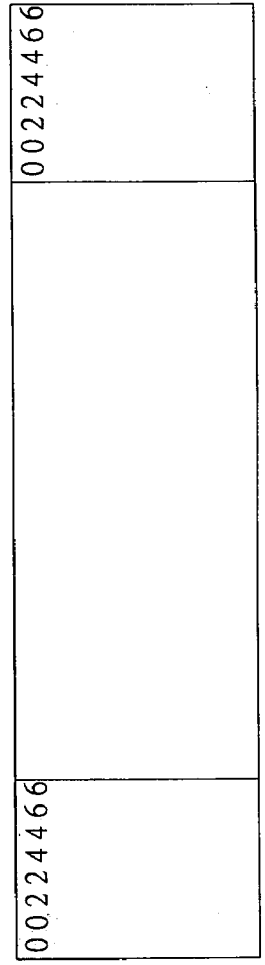

FIG. 3C shows the result after the pixel insertion. In this case, the pixel insertion respectively copies corresponding pixel values of the preceding column with respect to columns to be compensated. Since reduced image columns are located on the edges of an entire image frame and due to the simple pixel insertion, the data amount can be effectively reduced without affecting viewing.

Figure 4:
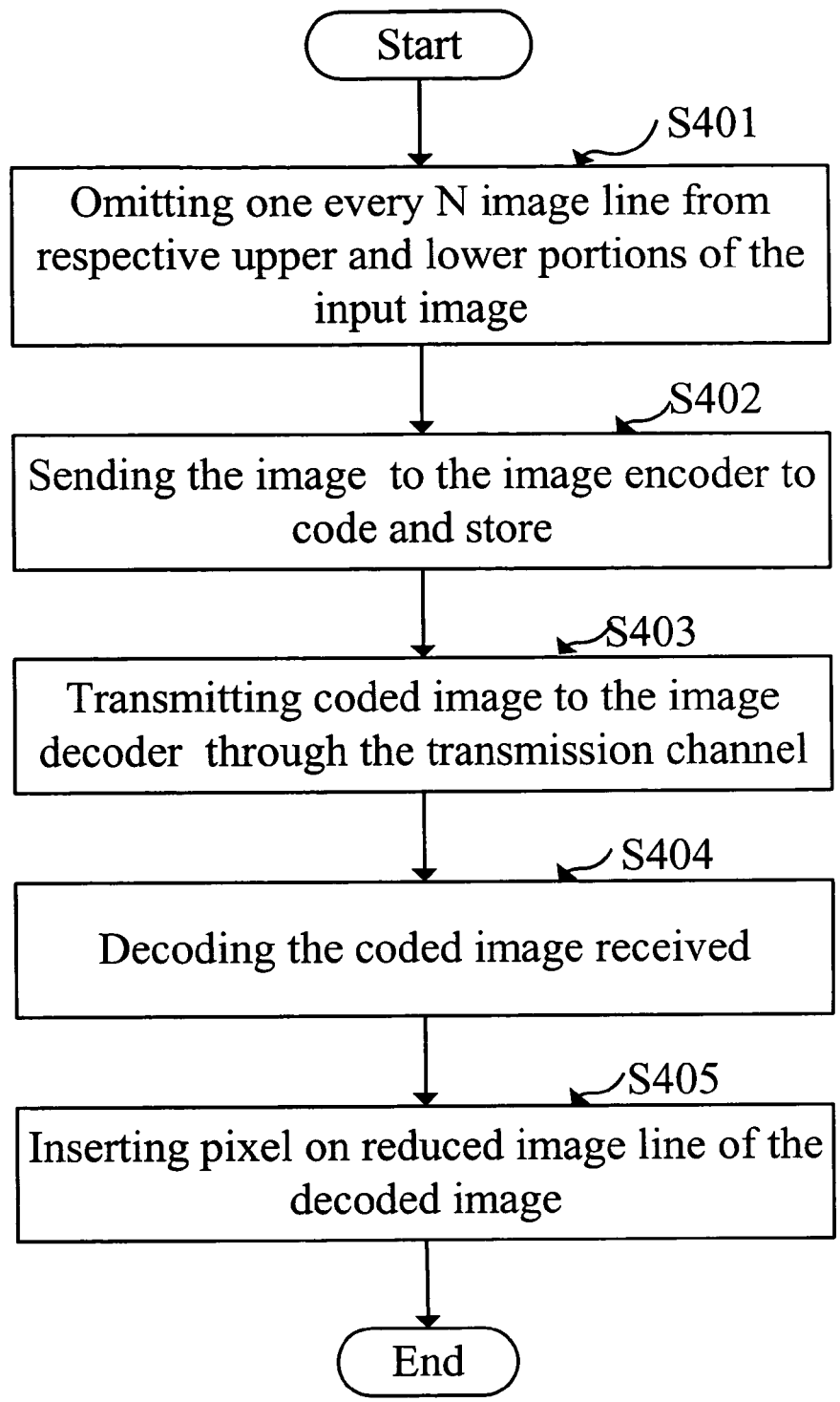
FIG. 4 is a flowchart of a method for reducing data amount in an image memory system in accordance with another embodiment of the invention.
Figure 5A:
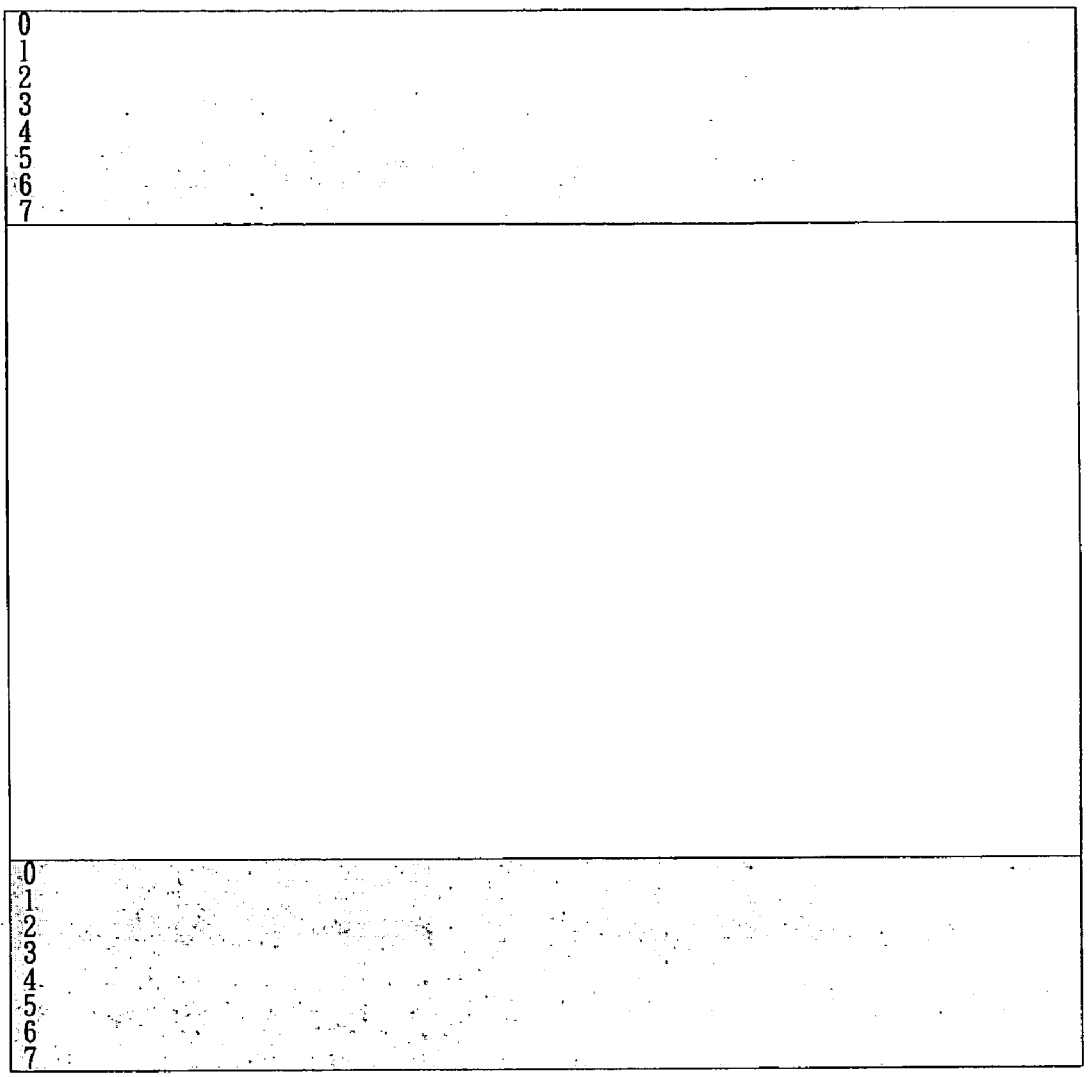
FIGS. 5A~C show an example of FIG. 4.
Figure 5B:
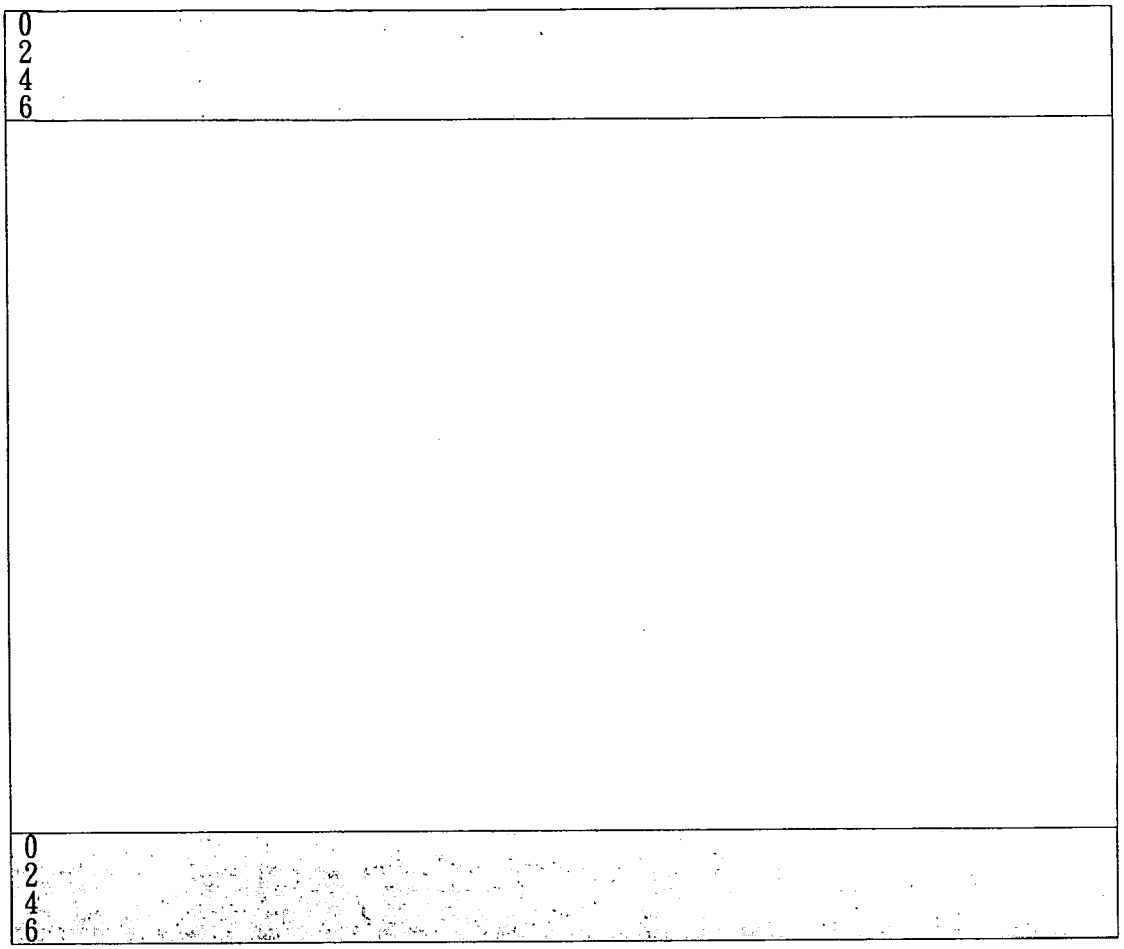
Figure 5C:
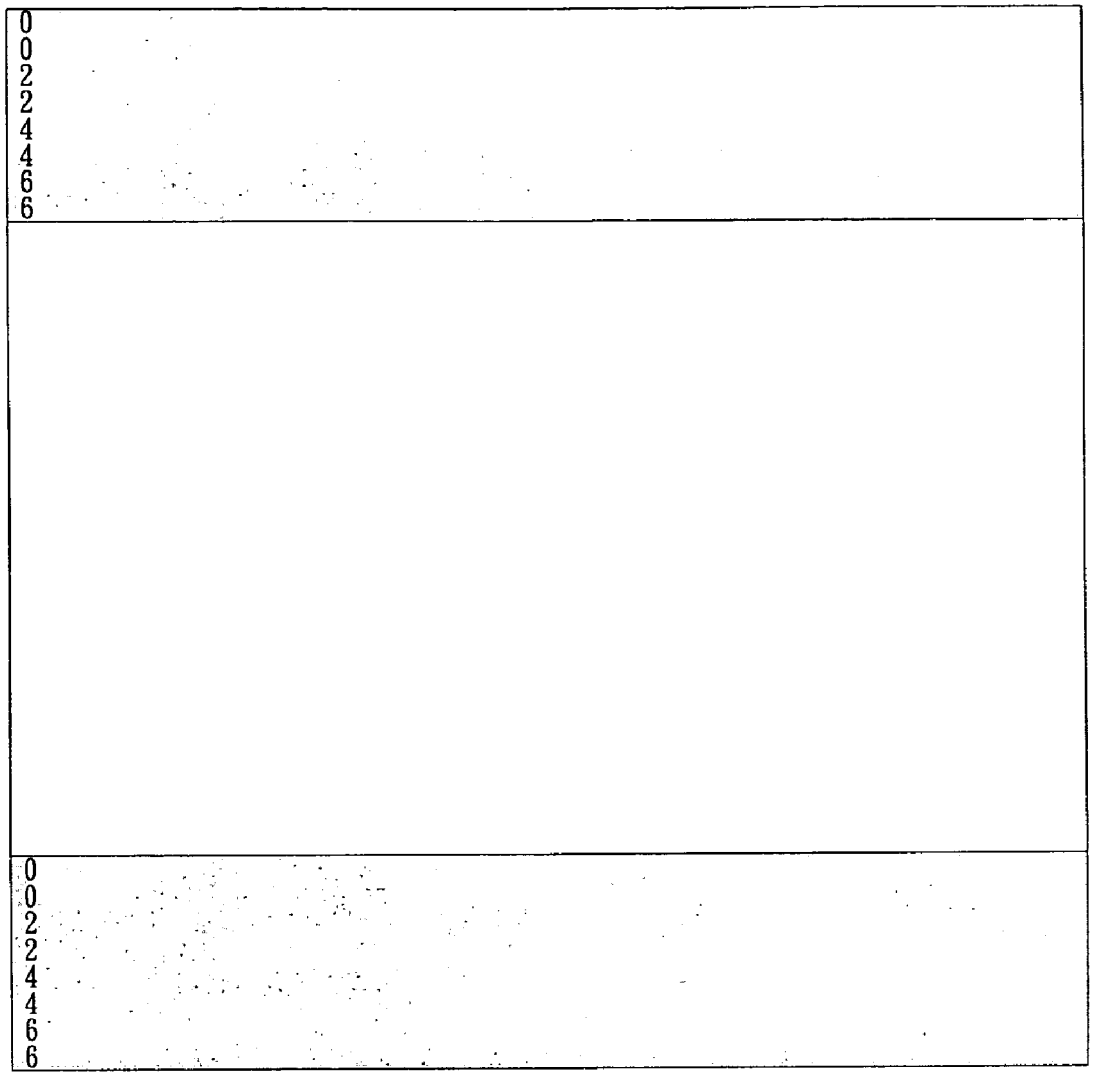

Alternatively, the inventive method can reduce data from upper and lower portions of the image 40, as shown in the flowchart of FIG. 4. FIG. 5A shows an example of omitting one image line from every two image lines. Thus, as shown in FIG. 5B, an image having a reduced data amount is obtained. FIG. 5C shows a result of performing pixel insertion on reduced image lines of a decoded image. This pixel insertion is a procedure similar to that of the previous embodiment, and thus a detailed description is deemed unnecessary.

In view of the foregoing, it is known that the invention can avoid using a larger capacity of DRAM because the data amount of the input image to the image encoder is reduced in advance, thus hardware cost can be saved. In addition, due to the simple pixel insertion, no visual impairment is generated.

Although the present invention has been explained in relation to its preferred embodiment, it is to be understood that many other possible modifications and variations can be made without departing from the spirit and scope of the invention as hereinafter claimed.

What is claimed is:

1. A method for reducing data amount in an image memory system, the system including an image encoder and an image decoder, the image encoder encoding an input image and sending an encoded image through a transmission channel to the image decoder to decode and output, the input image including a plurality of image lines, each having a plurality of pixels, an image column defined by pixels located at same positions on the image lines, the method comprising the steps of:

(A) based on a predetermined percentage, omitting one image column from every N image column in left and right portions of the input image, respectively, thereby obtaining an image having a reduced data amount; wherein the omitted image columns are located on edges of an entire image frame displaying the input image, and N is a positive integer greater than 1;

(B) sending the image having the reduced data amount to the image encoder to encode and accordingly store an encoded image;

(C) transmitting the encoded image to the image decoder through the transmission channel;

(D) decoding the encoded image by the image decoder as received, thereby obtaining a decoded image; and (E) performing a pixel insertion on reduced image columns of the decoded image.

2. The method as claimed in claim 1, wherein in step (A), N=2.

3. The method as claimed in claim 1, wherein in step (A), image columns omitted are respective odd or even columns.

4. The method as claimed in claim 1, wherein in step (A), image columns omitted based on the pre-determined percentage are smaller than or equal to 20% of total image columns of the input image.

5. The method as claimed in claim 4, wherein in step (A), image columns omitted based on the pre-determined percentage is 10% of total image columns of the input image.

6. The method as claimed in claim 1, wherein in step (E), the pixel insertion copies respectively corresponding pixel values of a nearest preceding image column with respect to image columns to be compensated.

7. The method as claimed in claim 1, wherein in step (E), the pixel insertion copies respectively corresponding pixel values of a nearest upcoming image column with respect to image columns to be compensated.

8. The method as claimed in claim 1, wherein in step (E), the pixel insertion copies respectively corresponding average pixel values of a nearest preceding and upcoming image column with respect to image columns to be compensated.

9. The method as claimed in claim 1, wherein in step (E), the pixel insertion uses an interpolation method to compute pixel values of image columns omitted.

10. The method as claimed in claim 1, wherein in step (E), the pixel insertion uses a finite impulse response (FIR) filter to compute pixel values of image columns omitted.

11. The method as claimed in claim 1, wherein in step (B), the encoded image can be stored in a storage device.

12. The method as claimed in claim 11, wherein in step (C), the encoded image is accessed by the image decoder from a storage device via the transmission channel.

13. A method for reducing data amount in an image memory system, the system including an image encoder and an image decoder, the image encoder encoding an input image and sending an encoded image through a transmission channel to the image decoder to decode and output, the input image including a plurality of image lines, each image line having a plurality of pixels, the method comprising the steps of:

(A) based on a pre-determined percentage, omitting one image line from every N image line in the upper and lower portions of the input image, respectively, thereby obtaining an image having reduced data amount; wherein the omitted image lines are located in edges of an entire image frame displaying the input image, and N is a positive integer greater than 1;

(B) sending the image having a reduced data amount to the image encoder to encode and accordingly store a coded image;

(C) transmitting the encoded image to the image decoder through the transmission channel;

(D) decoding the encoded image by the image decoder as received, thereby obtaining a decoded image; and (E) performing a pixel insertion on reduced image lines of the decoded image.

14. The method as claimed in claim 13, wherein in step (A), N=2.

15. The method as claimed in claim 13, wherein in step (A), image lines omitted are respective odd or even lines.

16. The method as claimed in claim 13, wherein in step (A), image lines omitted based on the pre-determined percentage are smaller than or equal to 20% of total image lines of the input image.

17. The method as claimed in claim 16, wherein in step (A), image lines omitted based on the pre-determined percentage is 10% of total image lines of the input image.

18. The method as claimed in claim 13, wherein in step (E), the pixel insertion copies respectively corresponding pixel values of a nearest preceding image line with respect to image lines to be compensated.

19. The method as claimed in claim 13, wherein in step (E), the pixel insertion copies respectively corresponding pixel values of a nearest upcoming image line with respect to image lines to be compensated.

20. The method as claimed in claim 13, wherein in step (E), the pixel insertion copies respectively corresponding average pixel values of a nearest preceding and upcoming image line with respect to image lines to be compensated.

21. The method as claimed in claim 13, wherein in step (E), the pixel insertion uses an interpolation method to compute pixel values of image lines omitted.

22. The method as claimed in claim 13, wherein in step (E), the pixel insertion uses an FIR filter to compute pixel values of image columns omitted.

23. The method as claimed in claim 13, wherein in step (B), the encoded image can be stored in a storage device.

24. The method as claimed in claim 13, wherein in step (C), the encoded image is accessed by the image decoder from a storage device via the transmission channel.

\* \* \* \* \*